United States Patent [19]

Dougherty

[11] 3,995,283

[45] Nov. 30, 1976

[54] SCREENING LIGHTHOUSE FOR COLOR CATHODE RAY TUBES

[75] Inventor: Lawrence W. Dougherty, Sleepy Hollow, Ill.

[73] Assignee: Zenith Radio Corporation, Chicago, Ill.

[22] Filed: Jan. 5, 1976

[21] Appl. No.: 646,802

[52] U.S. Cl. .................................. 354/1; 269/321 T

[51] Int. Cl.$^2$ .......................................... G03B 41/00

[58] Field of Search ....................... 354/1; 269/321 T

[56] References Cited

UNITED STATES PATENTS

| | | | |
|---|---|---|---|
| 2,932,241 | 4/1960 | Haas | 354/1 |
| 3,284,884 | 11/1966 | Prazak | 269/321 T |
| 3,395,628 | 8/1968 | Kautz et al. | 354/1 |

*Primary Examiner*—John Gonzales
*Attorney, Agent, or Firm*—J. H. Coult

[57] ABSTRACT

This disclosure depicts a novel low cost, high performance color cathode ray tube of the shadow mask type. The tube has a unique envelope, on a flangeless faceplate portion of which is corner-suspended a lightweight, non-self-rigid shadow mask. This disclosure stresses lighthouse apparatus useful in screening the faceplate of such a tube.

5 Claims, 24 Drawing Figures

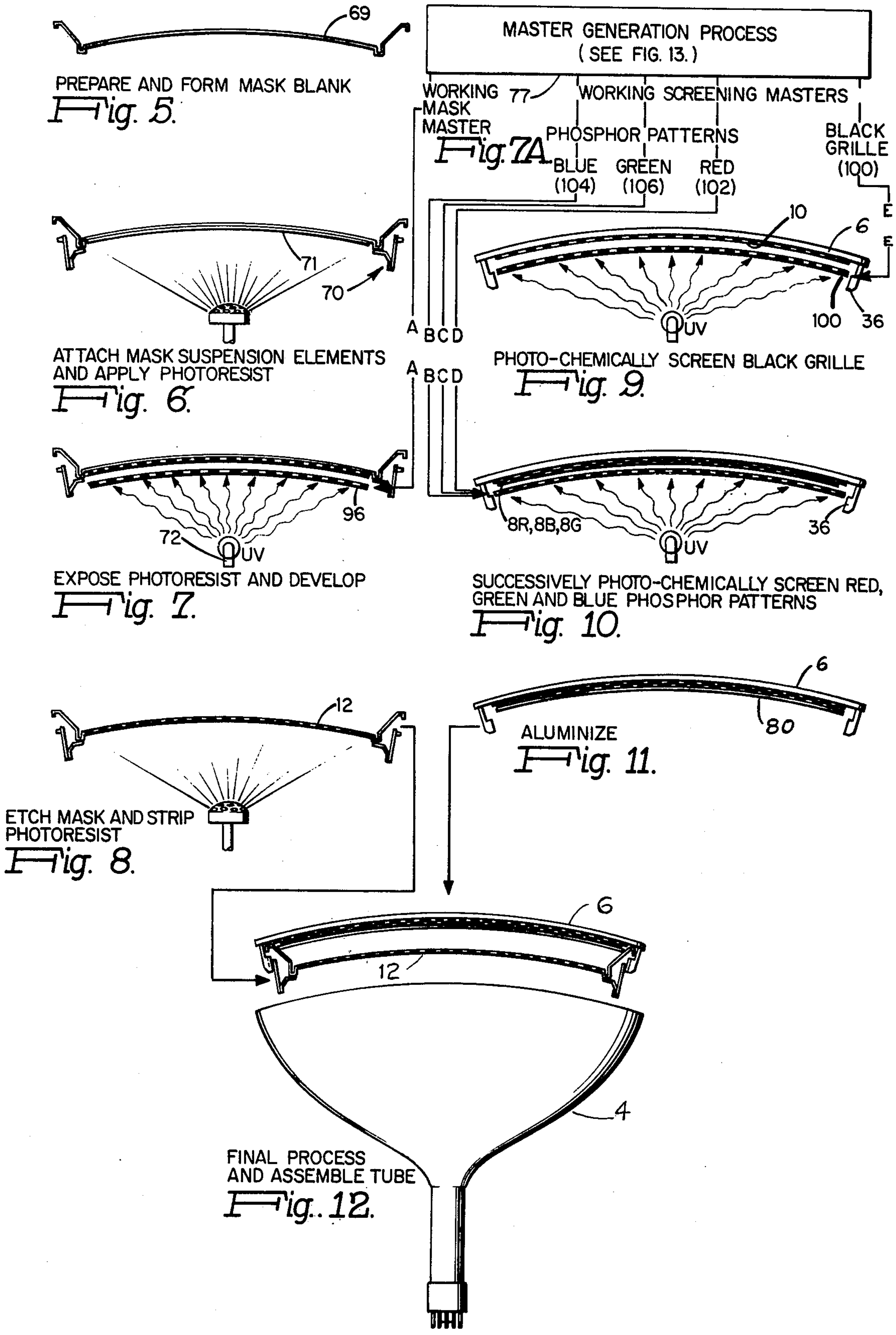
69
PREPARE AND FORM MASK BLANK
Fig. 5.
MASTER GENERATION PROCESS
( SEE FIG. 13.)
WORKING MASK MASTER
77
WORKING SCREENING MASTERS
PHOSPHOR PATTERNS
BLUE (104)
GREEN (106)
RED (102)
BLACK GRILLE (100)
Fig. 7A.
71
70
A B C D
E
10
6
100
36
UV
ATTACH MASK SUSPENSION ELEMENTS AND APPLY PHOTORESIST
Fig. 6.
PHOTO-CHEMICALLY SCREEN BLACK GRILLE
Fig. 9.
96
72
8R,8B,8G
EXPOSE PHOTORESIST AND DEVELOP
Fig. 7.
SUCCESSIVELY PHOTO-CHEMICALLY SCREEN RED, GREEN AND BLUE PHOSPHOR PATTERNS
Fig. 10.
12
80
ALUMINIZE
Fig. 11.
ETCH MASK AND STRIP PHOTORESIST
Fig. 8.
4
FINAL PROCESS AND ASSEMBLE TUBE
Fig. 12.

SCREENING LIGHTHOUSE FOR COLOR CATHODE RAY TUBES

CROSS-REFERENCE TO RELATED APPLICATIONS

This application is related to, but not dependent upon, copending applications incuding Ser. No. 285,985, filed Sept. 5, 1972 which has been abandoned in favor of a second generation continuation application Ser. No. 675,653, filed Apr. 12, 1976; Ser. No. 384,874, filed Aug. 2, 1973; Ser. No. 395,106, filed Sept. 7, 1973 which has been abandoned in favor of continuation-in-part application Ser. No. 535,473, filed Dec. 23, 1974 (now U.S. Pat. No. 3,943,399); Ser. No. 462,915, filed Apr. 22, 1974 (now U.S. Pat. No. 3,971,490); Ser. No. 527,001, filed Nov. 25, 1974; Ser. No. 603,984, filed Aug. 12, 1975; Ser. No. 536,041, filed Dec. 23, 1974(now U.S. Pat. No. 3,973,964); and Ser. No. 535,614, filed Dec. 23, 1974 (now U.S. Pat. No. 3,975,198), and to the subject matter of U.S. Pat. Nos. 3,794,873; 3,912,963; 3,894,260; 3,890,526; and 3,904,914, all assigned to the assignee of this invention.

BACKGROUND OF THE INVENTION

This application concerns a radically new and improved color television picture tube of the shadow mask variety. More particularly, this application is directed to lighthouse apparatus used to screen the faceplate of such a tube.

This unique tube alluded to has a construction quite different from conventional color cathode ray tubes. Conventional color cathode ray tubes have an envelope which comprises a funnel mated to a front panel having a deep, rearwardly extending flange. Mounted inside the front panel and carried on the rearward flange is a rigid mask-frame assembly. An electron gun assembly in the neck of the tube projects a plurality of electron beams through apertures in the mask whereupon the beams impinge a mosaic phosphor screen deposited upon the concave inner surface of the window portion of the front panel.

It is conventional to form the aforesaid mosaic phosphor screen by a photoscreening process which utilizes the mask as a photographic stencil in the deposition of the mosaic phosphor screen. Lighthouse apparatus used to accomplish the photoscreening typically comprises a table for supporting the front panel in a face down attitude with the shadow mask-frame assembly mounted therein. A light source contained in the bowels of the lighthouse irradiates a photosensitive coating on the concave inner surface of the viewing window through the apertures in the shadow mask. The photosensitive coating is then developed. By a series of exposures and developments, three interlaced patterns of red-emissive, blue-emissive and green-emissive phosphor elements are deposited as a mosaic on the inside surface of the viewing window. Another series of photoexposures and a development operation are required if the tube is of the type having a black matrix.

In order that the electron beams emitted by the gun assembly from the neck of the end product tube impinge mutually exclusively upon the phosphor elements they are designated to hit, it is important that the mosaic phosphor pattern, the shadow mask aperture pattern, and the electron gun assembly are all carefully positioned in the end product tube relative to each other.

To this end, during the photoscreening operations, the front panel is typically held in accurate position relative to the light source in the lighthouse by means of three precisely positioned bumpers which engage the outside surface of the front panel flanges at three points on the periphery of the front panel. These same bumpers are used as reference elements in the final tube assembly process.

The afore-described unique tube with which this invention is associated has an envelope comprising a flangeless, dished faceplate and a mating funnel whose mouth engages the concave rear surface of the faceplate. In the said unique tube, the shadow mask is suspended on the viewing window itself, on areas thereof outside the phosphor screen, by means of suspension devices in the corners of the faceplate. In the assembly of this novel tube, a unique system for referencing the faceplate to the funnel (and thus to the electron guns in the neck portion of the funnel) is employed. Rather than using external referencing means, as described, portions of the mask suspensions devices are internally referenced to integral provisions on the inside of the corners of the funnel mouth.

Because the referencing principles employed in the construction and manufacture of this unique tube are so different from those employed in the construction and manufacture of conventional tubes, and because the novel tube has so different a physical character, lighthouse apparatus used to screen conventional tubes is not suitable for use in the photoscreening of the faceplate of the said tube.

OBJECTS OF THE INVENTION

It is a general object of this invention to provide apparatus for photoscreening the faceplate of a shadow mask-type color cathode ray tube, and particularly for use in screening a faceplate characterized by an absence of a rearward flange as found on conventional color CRT front panels.

It is another ojbect to provide screening lighthouse apparatus for a color cathode ray tube having a flangeless faceplate and utilizing an internal referencing principle to relate the faceplate to the funnel, and thus to the electron guns positioned in the neck of the funnel.

It is yet another object to provide such lighthouse screening apparatus which is advantageously suited to automated or rapid manual faceplate loading and unloading.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIGS. 5–12 collectively constitute a flow diagram describing synoptically the manufacture of the novel tube shown in FIGS. 1–4;

Figure 1:
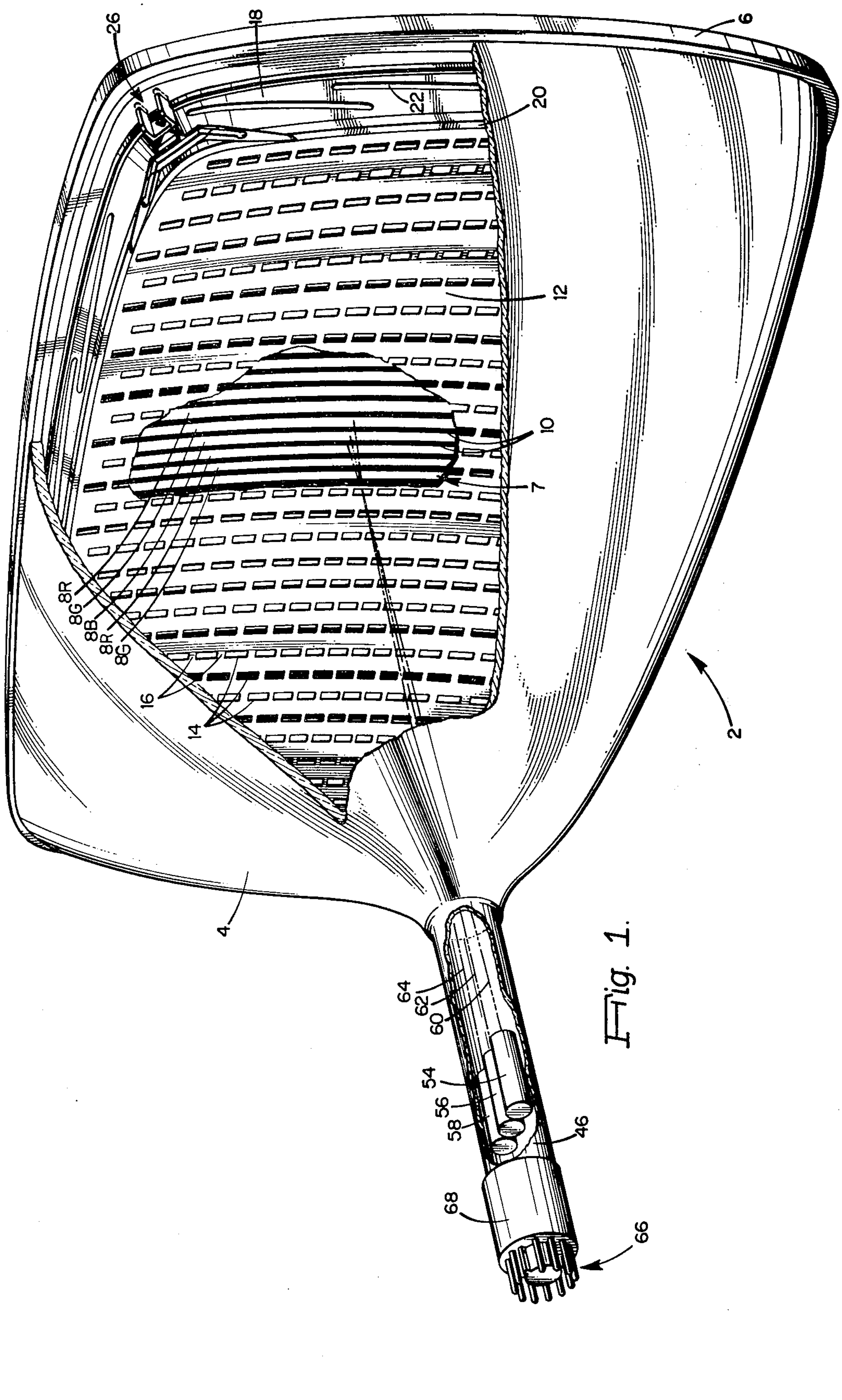
FIG. 1 is a schematic perspective view of a novel color cathode ray tube made in accordance with the teachings of the present invention; certain parts are shown in exaggerated dimension for clarity of illustration.

PRIOR ART 3,595,112, 3,601,018, 2,817,276, 3,211,067, 3,420,150.

DESCRIPTION OF THE PREFERRED EMBODIMENTS

This invention is directed to the provision of screening lighthouse apparatus for screening a unique tube of the type described above briefly. Before engaging in a description of this invention, a more detailed description of the tube with which this invention is most advantageously used will be given.

FIGS. 1–4 illustrate a shadow mask-type color tube 2 made using the teachings of this invention. It is noted at this point that the tube is readily adaptable to non-interchangeable manufacture, i.e., it may be made by the conventional method of pairing a shadow mask with a particular screen throughout at least the screening and subsequent tube fabrication operations. Preferably, however, the tube is made in such a way that the tube's shadow mask is interchangeable, each with all others, as are the screened faceplates. Certain advantages of mask and faceplate interchangeability will be described in more detail below.

The illustrated tube 2 is shown as having a unique envelope comprising a funnel 4 sealed to a flangeless faceplate 6. Unlike conventional faceplate structures, the novel construction of the faceplate 6 without a flange permits economies in manufacture of the envelope and simplified and economical screening processes.

On the inner surface of the faceplate 6 is disposed a phosphor screen 7. Whereas the screen 7 may take any of a wide variety of other configurations such as the conventional dot screen configuration, in the illustrated embodiment it is shown as comprising an array of vertically oriented, horizontally repeating triads of red-emissive, blue-emissive and green-emissive phosphor elements, 8R, 8B and 8G. The screen is preferably of the negative guardband, black surround-type as disclosed in a U.S. Pat. No. to Fiore et al — 3,146,468. A black grille 10 comprises, in this embodiment, a pattern of light-absorptive bands separating the phosphor elements 8R, 8B, 8G. Apparatus for photoscreening the faceplate is the subject matter of this invention and will be described in detail hereinafter.

A shadow mask 12 has formed therein a pattern of apertures 14. Whereas aperture patterns of other types may be employed, the mask 12 is shown as having an aperture pattern of the so-called slot-type in which the apertures 14 have the form of rectangular slots arranged in vertically oriented rows, each slot in a row being separated from its neighboring slots by a "tie bar" 16.

In order to establish the preferred negative guardband condition, the width of the mask apertures 14 is caused to be such that the electron beam landings 15 on the phosphor elements 8R, 8B, 8G are wider than the impinged phosphor elements by an amount equal to an allotted (negative) guardband.

The shadow mask construction is described and claimed specifically in the referent U.S. Pat. No. 3,912,963. Briefly, the shadow mask 12 is preferably composed of a frameless, one-piece construction formed from a single sheet of electrically conductive material such as steel. An integral skirt 18 provides rigidity for the mask and shields the screen 7 from stray and overscanned electrons. Integrally formed ribs 22, channel 20 and edge lip 24 cause the mask 12 to be relatively stiff with respect to the major and minor axes thereof, while permitting the mask to flex with respect to its diagonals and thereby conform, when mounted, to twist deviations in the contour of the faceplate.

A suspension system of unique construction is provided for supporting the shadow mask 12 in spaced adjacency to inner surface of the faceplate 6. The suspension system shown is not the subject of this application, being described and claimed in the referent patents and copending applications.

The suspension system preferably comprises four suspension devices 26, one at each corner of the mask 12. As noted, the shadow mask 12 is constructed so as to be relatively rigid with respect to its major and minor axes, but less rigid with respect to its diagonals. By mounting the suspension devices 26 at the corners of the mask 12, unit-to-unit deviations in the faceplate with respect to the faceplate diagonals are followed by corresponding flexure of the shadow mask 12 so as to maintain a constant "Q" spacing, i.e., a constant spacing between the central apertured portion of the shadow mask 12 and the inner surface of the faceplate 6 carrying the phosphor screen 7.

In the illustrated suspension system, the suspension devices 26 each comprise a bracket 28 mounted on a corner of the mask which carries a leaf spring 30 which is relatively resilient, but tangentially stiff (in its own plane). The spring 30 carries on its distal end a lug 32 which is received within a lug-receiving opening 34 in a faceplate-mounted stud 36 when the mask 12 is mounted in its operative position on the faceplate 6.

The stud 36 has a channel shape with a forwardly extending face 40 containing the lug-receiving opening 34 and two legs 42, 44 which are embedded in (or which may be cemented to) the faceplate 6. The spaced legs 42, 44 permit screening fluids suffused across the faceplate to pass through the stud 36 to prevent build-up and subsequent wave reflection of the fluid back into the screen area, resulting in non-uniform fluid deposition.

As shown in FIG. 1, the tube 2 has a neck 46 within which is contained an electron gun assembly. The electron gun assembly may take any of a variety of constructions, but in the illustrated embodiment wherein the mask is a slot mask cooperating with a screen of the line-type, the electron gun assembly preferably is of the in-line type, wherein three separate guns 54, 56, 58 generate three coplanar beams 60, 62, 64 intended to carry, respectively, red-associated, blue-associated and green-associated color video information. The electron gun assembly is electrically accessed through pins 66 in the base 68 of the tube.

Methods for manufacturing tubes such as tube 2 will be very briefly described. However, before engaging in this description, it will be useful to again allude to the conventional practices for making standard shadow mask-type color tubes. According to conventional practice, the shadow mask assembly is made before the faceplate is screened and the shadow mask is used as a photographic stencil during the photochemical deposition of the screen on the faceplate. Each mask, being different in its aperture pattern from all others, must be uniquely paired to a particular faceplate during the screen photoexposure operations and thereafter in order to assure correspondence between mask aperture patterns and phosphor patterns in the assembled tubes. As will be explained in more detail below, this invention may be employed in a tube manufacturing process wherein the pairing of masks 12 and screen-bearing faceplates 6 is avoided. According to that process, the masks are made in one manufacturing process and the faceplates are screened in a separate process. The masks and screened faceplates are mated at a tube final assembly point. Such a tube manufacturing process is herein labeled for convenience an "interchangeable mask"process.

A synopsis of the aforesaid interchangeable mask process of tube manufacture will be given in conjunction with the FIGS. 5–12 flow diagram.

In FIG. 5 a formed mask blank 69 is intended to represent a series of processing steps in which a shadow mask blank is prepared and metal-formed to have the afore-described three-dimensionally curved configuration with peripheral rigidifying and electron shielding structures. Unlike conventional mask manufacturing processes wherein the aperture pattern is created before the mask blank is metal-formed, in the said interchangeable mask process, the mask blank is formed before the mask aperture pattern is etched into it.

FIG. 6 represents a sequence of processing steps wherein mask suspenson elements 70 are mounted on the mask blank 69 and a layer 71 of photoresist (a photosensitive etchant-resistant material) is deposited on the concave side of the formed mask blank 69.

FIG. 7 represents processing steps wherein a mask master 96, derived in a master generation process 77, is supported adjacent to the concave surface of the mask blank 69 and the photoresist layer 71 is exposed to a source 72 of ultra-violet radiation. The exposed photoresist layer 71 is developed to create a pattern of openings in the photoresist layer in the locations in which apertures are to be formed in the mask blank 6.

FIG. 8 represents processing steps by which the mask blank 69 is etched to form a pattern of mask apertures therein, and in which the photoresist layer 71 is stripped and the resulting mask 12 prepared for final assembly in a tube.

FIG. 9 represents processing steps by which a black surround of "black grille" 10 is photochemically deposited on the inner surface of a faceplate 6 by the use of a black grille screening master 100 derived in the master generation process 77 alluded to above.

FIG. 10 represents a series of three screening processes in which patterns of red-emissive, blue-emissive and green-emissive phosphor elements 8R, 8B, 8G are deposited in succession in the openings in the black grille 10 previously formed on the inner surface of the faceplate 6. These three screening operations also employ screening masters, shown collectively at 102–106, developed in the master generation process 77 which is employed to produce the black grille screening master 100 and the mask master 96.

FIG. 11 represents a process by which a layer 80 of electrically conductive, optically reflective metal, typically aluminum, is deposited on the screened faceplate 6, the aluminum layer 80 serving, as is well known, as an electrically conductive electrode for receiving the beam accelerating voltage (the screen or "ultor" voltage) and as a mirror for reflecting light emitted by the phosphor elements forwardly to the viewer.

FIG. 12 represents the final processing and assembly steps by which the mask 12 is attached to the completed screened faceplate 6, the faceplate 6 is sealed to the funnel 4, the electron gun (not shown) is inserted into the neck of the tube, the tube is evacuated, and assembly is otherwise completed.

In order to more fully understand the invention when it is later described, a brief description of the contemplated actual structure of the working screening masters 100, 102, 104 and 106, will now be engaged; see FIGS. 13–18. (The working screening masters to be described do not constitute a part of this invention, per se, but are described and claimed in the referent copending application Ser. No. 535,614.)

A structuralized rendition of one of the working screening masters 100–106 is illustrated in FIGS. 13–18. For reasons to be described, each of the working screening masters is preferably capable of flexing about its diagonals to conform to unit-to-unit tolerance-related variations in the faceplates being screened. Stated in another way, the working screening masters should be indistinguishable from an end-product shadow mask, at least as to their mechanical influence on a faceplate 6. Briefly, the reason for this desired mechanical similarity between the working screening masters 100–106 and the end-product shadow mask 12 is as follows. If a shadow mask selected at random from a rack of shadow masks, when assembled in a tube, is to have its pattern of mask apertures register with the associated pattern of phosphor element triads on a screened faceplate, then the working screening masters must simulate the shadow mask during the screening process.

In the interest of simplifying this explanation, in the ensuing discussion the working screening master discussed will be assumed to be the working grille master 100. The discussion, however, is equally applicable to masters 102, 104 and 106. With the above-identified ends in mind, the working screening master 100 preferably comprises a thin (for example 100 mils thick), highly polished, spherical glass blank 194, the convex surface 206 of which contains the working screening master stencil pattern 203. The sphericity of the convex surface 206 corresponds to that of the concave inner surface of the faceplate 6.

In order to simulate the mounting means on the shadow mask 12, the working screening master 100 may have a skirt structure and a mounting assembly which closely resembles the skirt structure and mounting assembly of the shadow mask 12. The working screening master 100 is shown as having a frame 210 formed integrally in one piece from a sheet of steel or other material similar to that used to make the shadow mask 12, and includes a stiffening channel 212, a skirt 214 and a stiffening lip 216 which closely resemble the corresponding structures on the shadow mask 12. Four corner-located mounting assemblies 196 resemble the corresponding assemblies used to suspend the shadow mask 12. Each of the mounting assemblies 196 comprises a bracket 220 supporting a spring 222 on which is mounted a lug 224. In order that during a screening operation the convex surface 206 of the blank 194 is located in a preferred near-contact relationship to the concave surface of a faceplate being screened (to be described later), the blank 194 is attached to the frame 210 (as with epoxy-type cement) at an appropriate location near the base thereof.

Figure 15:
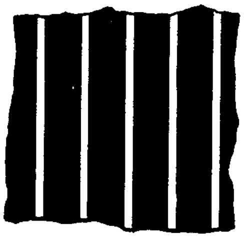
FIGS. 15–18 are enlarged views of a portion of the master stencil patterns carried by the four FIG. 13 working screening masters; the portion shown is that circled in FIG. 13.
Figure 16:
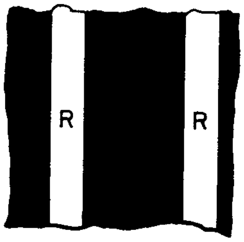
Figure 17:
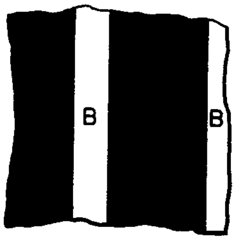
Figure 18:
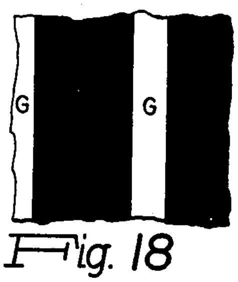

FIGS. 15–18 represent a common enlarged area of the stencil patterns of the four different screening masters 100, 102, 104, 106. FIG. 15 shows the screening master stencil pattern for the black grille. FIG. 16 shows the screening master stencil pattern for the red phosphor pattern. FIG. 17 shows the screening master stencil pattern for the blue phosphor pattern. FIG. 18 shows the screening master stencil pattern for the green phosphor pattern. In each of the FIGS. 15–18 the clear areas represent spaces between opaque stencil material. It should be understood, of course, that whereas positive screening images are represented in FIGS. 15–18, the polarity of the stencil patterns on the screening masters is a function of the type of photoresist material used in the screening processes (i.e., whether the resist is negative-working or positive-working), the nature of the screening process, and other factors. For example, in the most widely used commercial process for depositing the black grille, and the one recommended here, the grille master stencil pattern (FIG. 15) would be of a positive polarity. The method alluded to is described in U.S. Pat. No. 3,632,339.

A more detailed explanation will now be given of the FIGS. 9 and 10 screening operations by which a phosphor screen is deposited on the inner surface of the cathode ray tube faceplate using the above-described working screening masters 100–106. (Alternatively, as noted, in a more conventional process, a shadow mask may be used as the photographic stencil, rather than four special screening masters.)

As discussed very briefly above, FIG. 9 represents the black grille deposition process. The black grille deposition process, insofar as its chemistry and photochemistry is concerned, may be conventional, for example as described in U.S. Pat. No. 3,632,339 — Kahn, assigned to the assignee of the present invention. Briefly, the process described in the Kahn patent includes the steps of depositing on the faceplate 6 a coating of a photosensitive material such as dichromated PVA (polyvinyl alcohol) and then exposing the coating to a light pattern through the working grille master 100. After exposure of the PVA coating, the coating is developed to yield a pattern of PVA strips whose distribution, size and shape correspond to the distribution, size and shape of the openings desired to be formed in the black grille. After development of the PVA coating, the faceplate is covered with a layer of a light-absorptive material such as graphite. The graphite layer is then dried and a chemical stripping agent such as hydrogen peroxide is used to strip the pattern of PVA elements from the faceplate, and with it the overlying light-absorptive material. The result is a black grille having openings whose distribution, size and shape are those which the phosphor elements are desired to have.

As shown schematically in FIG. 10, after the black grille 10 is photochemically deposited upon the faceplate 6, patterns of red-emissive phosphor elements 8R, green-emissive phosphor elements 8G and blue-emissive phosphor elements 8B are deposited in succession in the openings formed in the black grille 10. The chemical processes for screening the patterns of red-emissive, blue-emissive and green-emissive phosphor elements onto the faceplate may be according to standard practices in the art. Briefly, each of these three phosphor screening operations may involve depositing on the black grille a photosensitive phosphor layer containing, typically, dichromated PVA and a phosphor material. The layer is dried and exposed to ultraviolet radiation in a lighthouse (described below) through the appropriate one of the working screening masters 102–106. The master stencil pattern on the working screening master would be of the nature shown in either of FIGS. 16, 17 or 18, depending on which phosphor pattern was being deposited.

After exposure of the photosensitive phosphor-containing layer, the screening master is removed and the photosensitive layer developed to produce a pattern of phosphor elements filling one-third of the openings in the black grille 10. After successive deposition of the remaining two patterns of phosphor elements, all of the openings in the black grille 10 are filled. The faceplate 6 at this point in its processing contains on its inner surface a black grille 10 having in the openings thereof three interlaced patterns of red-emissive, blue-emissive and green-emissive phosphor elements. In the tube embodiment being described, namely a slot-mask, line-screen tube, the openings in the black grille 10 and the phosphor elements 8R, 8B, 8G deposited therein are configured as strips which extend from the top to the bottom of the screen without interruption.

In each of the described four screening operations (black grille and three phosphor patterns), the principle of near-contact exposure is practiced. This principle will be discussed below after the present invention is described.

Figure 19:
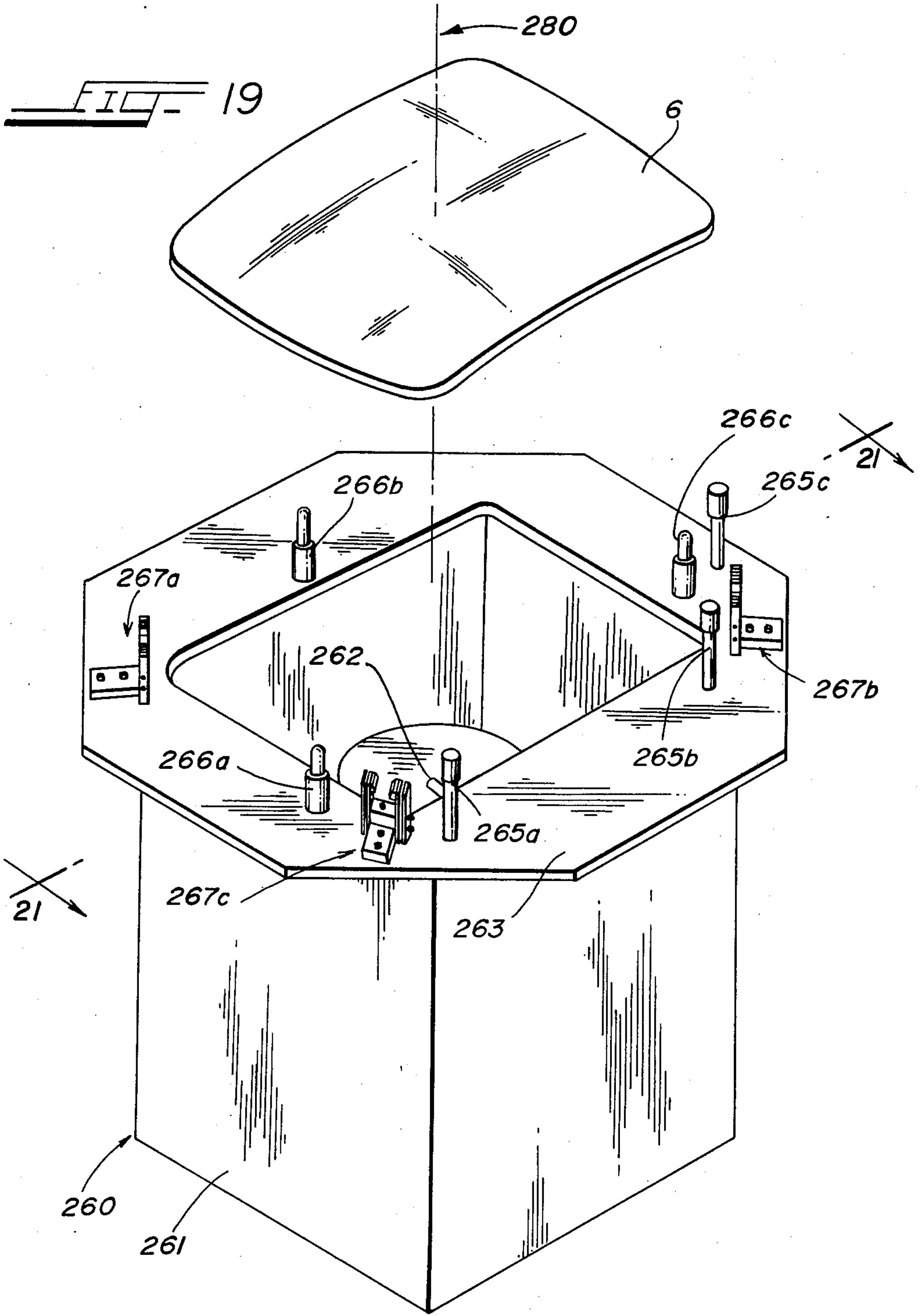
FIGS. 19, 20 and 21 are perspective, plan and side sectional view of screening lighthouse apparatus constructed according to this invention for photoexposing the faceplate of a tube as shown in FIGS. 1–4.
Figure 20:
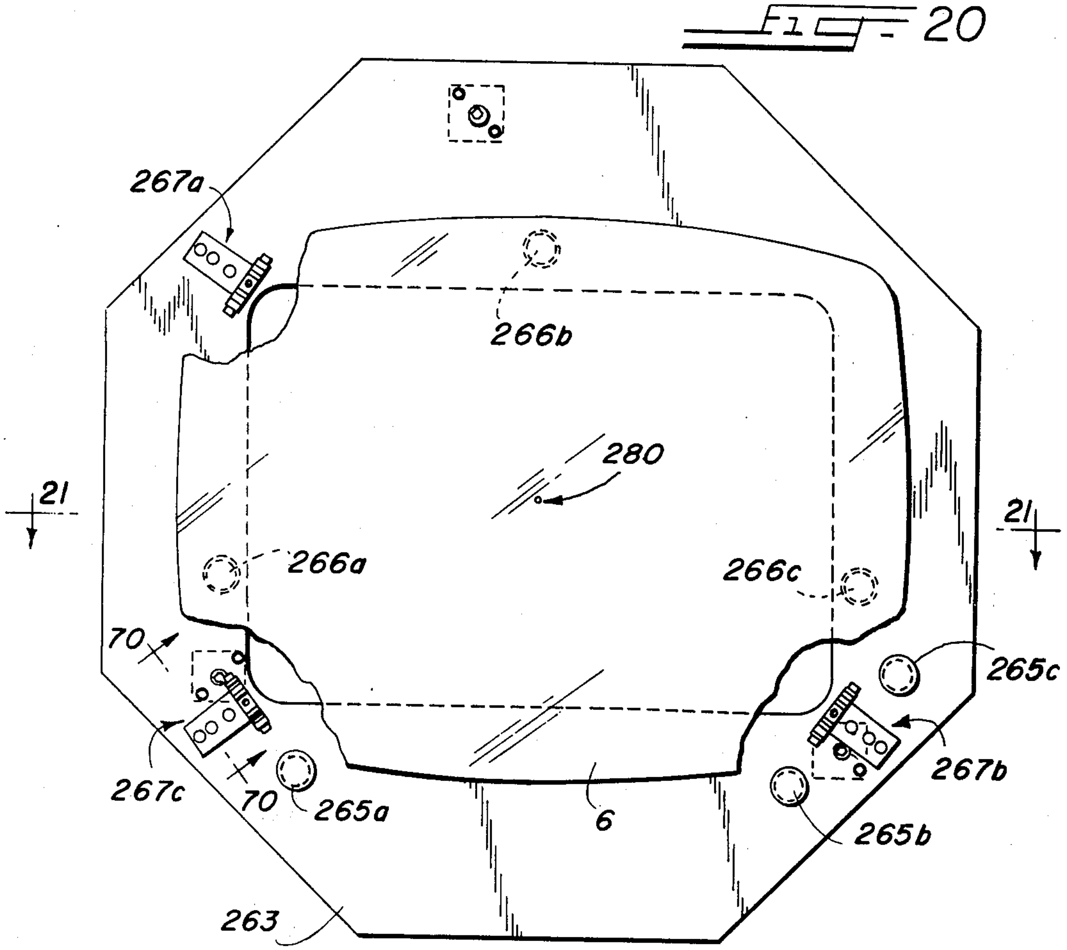
Figure 22:
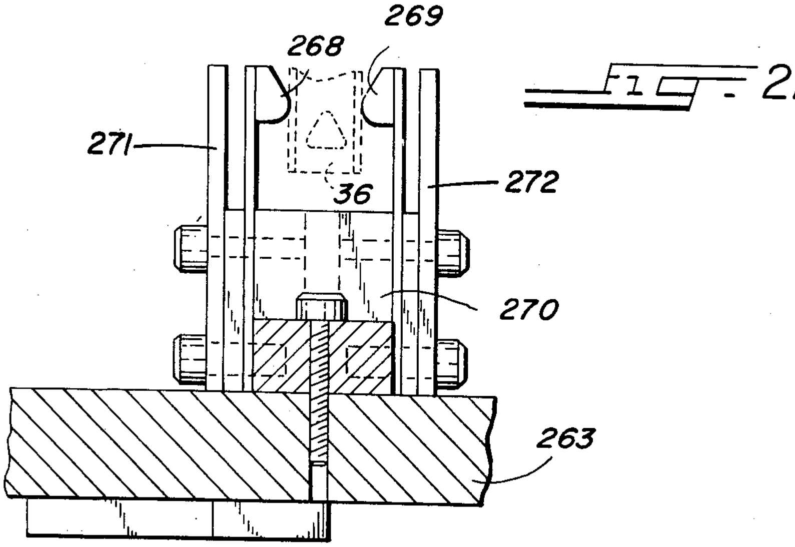
FIG. 22 is an enlarged view of a chuck constituting one of four such chucks found in the FIGS. 19-21 lighthouse apparatus.
Figure 21:
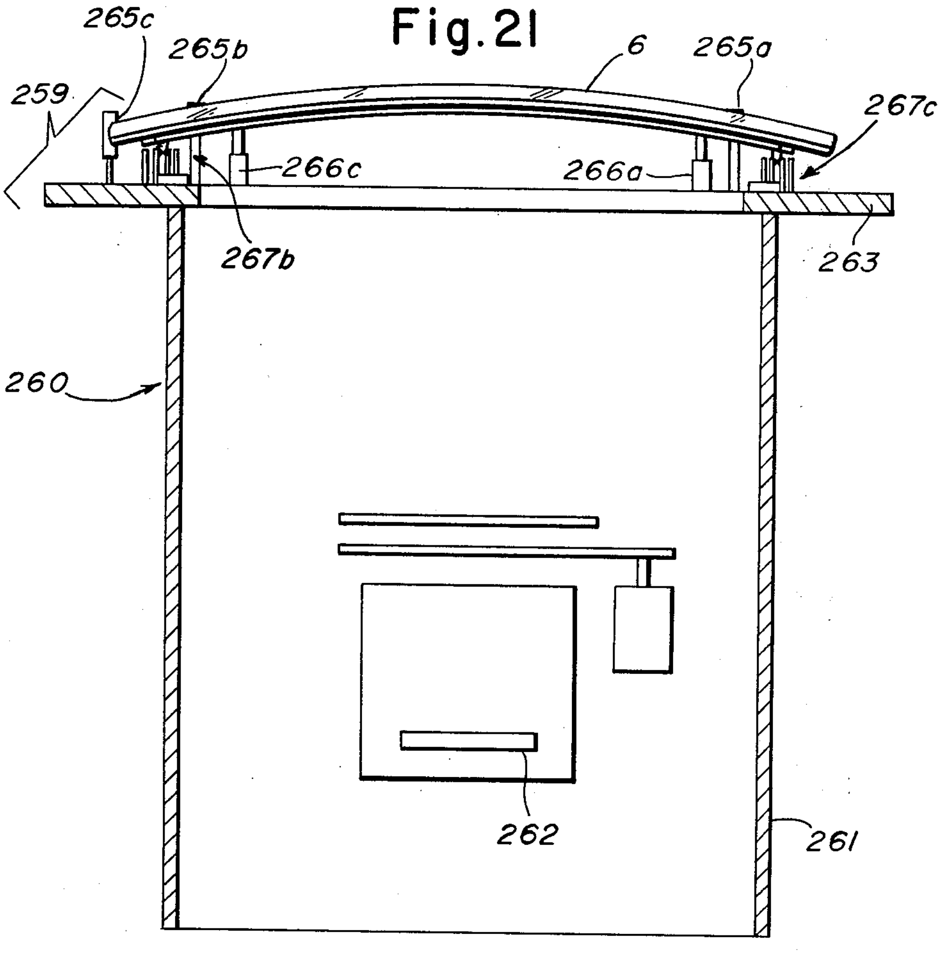

In accordance with the present invention the screening of faceplate 6 is preferably accomplished in a lighthouse 260 as shown schematically in FIGS. 19–21. The lighthouse 260 is illustrated as comprising a base 261 within which is contained a source 262 of ultraviolet radiation. In the manufacture of line screen tubes, the light source is preferably of the line type, oriented in the direction in which the phosphor strips are to be formed on the faceplate 6.

The lighthouse 260 includes on the base 261 a fixture 259. The fixture comprises a table 263 having a set of three prealignment posts **265*a*, 265*b*, 265*c* for prealigning a faceplate 6 to be screened, and a set of three support posts 266*a*, 266*b*, 266*c* for supporting the weight of the faceplate 6. The prealignment posts 265*a*, 265*b*, 265*c* may have a construction similar to that of conventional faceplate alignment posts. The support posts 266***a*, 266*b*, 266*c* may also be of conventional construction.

To precisely align the faceplate 6 during the photoexposure operations, there is provided a set of three alignment chucks 267*a*, 267*b*, 267*c* in three corners of the table 263 for receiving three studs 36 (see FIG. 3) extending from the corners of the faceplate 6. Each of the chucks is shown as comprising a pair of spring jaws 268, 269 supported by a base structure 270. The jaws 268, 269 are backed by stops 271, 272 to prevent overstressing of the jaws 268, 269. The alignment chucks 267*a*, 267*b*, 267*c* are anchored to the table 263 with a high degree of positional accuracy, and, by the symmetrical pinching, stud-centering effect thereof, they accomplish a precise positioning of the faceplate 6 relative to the light source in exactly the same fashion as is used to position the faceplate relative to remaining tube components during tube assembly.

Before describing the alignment chucks 267*a*, 267*b*, 267*c*, it should be understood that the prealignment posts 265*a*, 265*b*, and 265*c* cooperate with the alignment chucks 267*a*, 267*b*, 267*c* in a special way. The prealignment posts are not employed to achieve precise positioning of the faceplate, but serve to permit rapid manual or automated rough location of the faceplate over the alignment chucks 267*a*, 267*b*, 267*c*. Without the prealignment posts, the faceplate would have to be very carefully positioned with the studs 36 in registry with the chucks, before the faceplate could be lowered into engagement by the chucks. This would be a time consuming and therefore costly procedure. Further, damage to the chucks would be more likely absent the prealignment posts.

The prealignment posts serve not only as an aid in positioning the faceplate, but also as a guide as the faceplate is lowered into engagement with the chucks. The lower portion of each of the prealignment posts is relieved (has a reduced diameter) in order that once the alignment chucks receive the studs, positional control of the faceplate is shifted from the prealignment posts to the chucks and the prealignment posts (in effect) back away.

It should be noted that because the studs 36 are on the opposite side of the faceplate from an operator attempting to load the faceplate, it would be quite difficult to register the studs with the chucks absent the prealignment posts. The prealignment posts are easily visible, however, to an operator and can be used to facilitage and expedite a rapid and troublefree insertion of the faceplate into the chucks.

A screening lighthouse having a fixture as shown at 259 has been constructed and successfully tested. The tested lighthouse employed chucks 267*a*, 267*b* and 267*c* in three of the corners of the table, as shown in FIGS. 19–22. It should be noted that a chuck is not necessary in the fourth corner, since the six points of engagement in the plane of the face plate provided by the chucks 267*a* 267*b* and 267*c* provide an absolute positioning of the faceplate relative to the lighthouse (and therefore relative to the light source located in the bowels of the lighthouse) in the same way as is done in tube assembly.

The fixture constructed and tested employed alignment chucks as shown in FIGS. 19–22. See especially FIG. 22. The jaws 268, 269 were formed from steel and were so constructed and spaced as to apply a symmetrical pinching force to the stud 36 inserted therebetween. It should be noted that a relatively high force must be applied by the jaws to the studs in order to overcome any frictional forces applied to the inner surface of the faceplate 6 by the support posts 266*a*, 266*b*, 266*c*.

During each photoexposure operation, one of the working screening masters 100–106 is employed to determine the illumination pattern cast on the faceplate 6. The selected working screening master (for discussion purposes, assume it is the working grille master 100) is suspended on the studs 36 by engagement of the lugs 224 in the lug-receiving openings 34 in the studs. As stated above in the discussions of FIG. 9 and 10 and in the description of the working screening masters (FIGS. 13–18), the working screening master stencil pattern is supported in near-contact relationship to the inner surface of the faceplate 6. This is achieved by appropriate dimensioning of the master and its mounting assemblies. By way of example, assuming a contour variation in the working screening masters 100–106 of about ± 15 mils and in a production faceplate 6 of about 22 mils (measured from the plane of the lug-receiving openings 34 in the studs 36), the nominal spacing of the working screening masters 100–106 from the faceplate is caused to be between 39 and 72 mils, e.g., about 50 mils.

Figure 2:
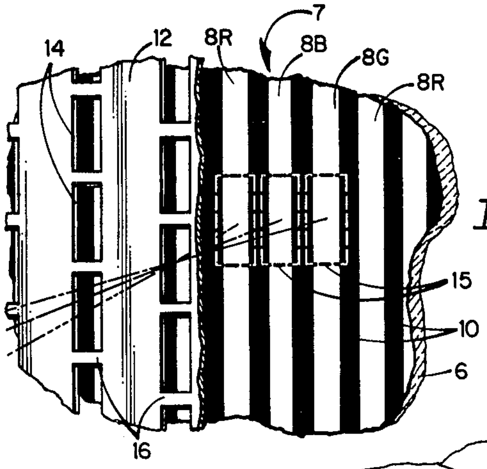
FIG. 2 represents an enlargement of a portion of the FIG. 1 tube.
Figure 3:
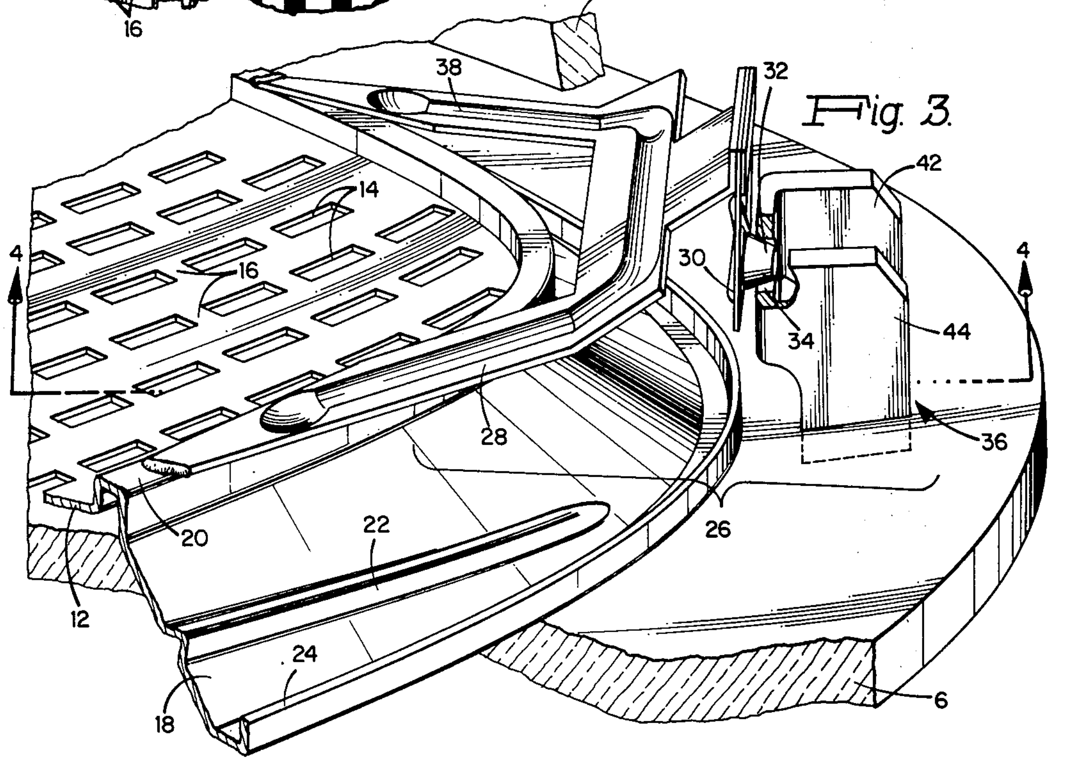
FIG. 3 is an enlarged fragmentary perspective view, shown partially sectioned and broken away, of a corner of the tube shown in FIG. 1, revealing with particular clarity one of the suspension elements for mounting the shadow mask on the tube faceplate.
Figure 4:
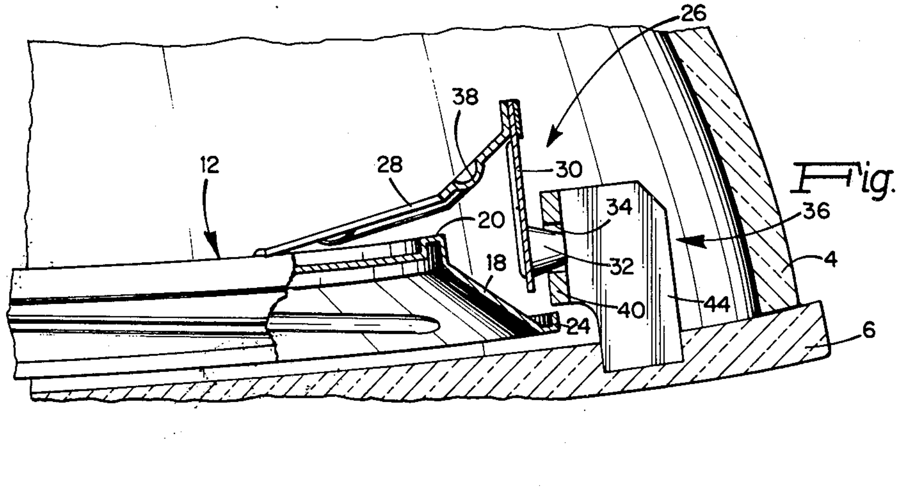
FIG. 4 is a section view taken generally along lines 4—4 in FIG. 3.
Figure 13:
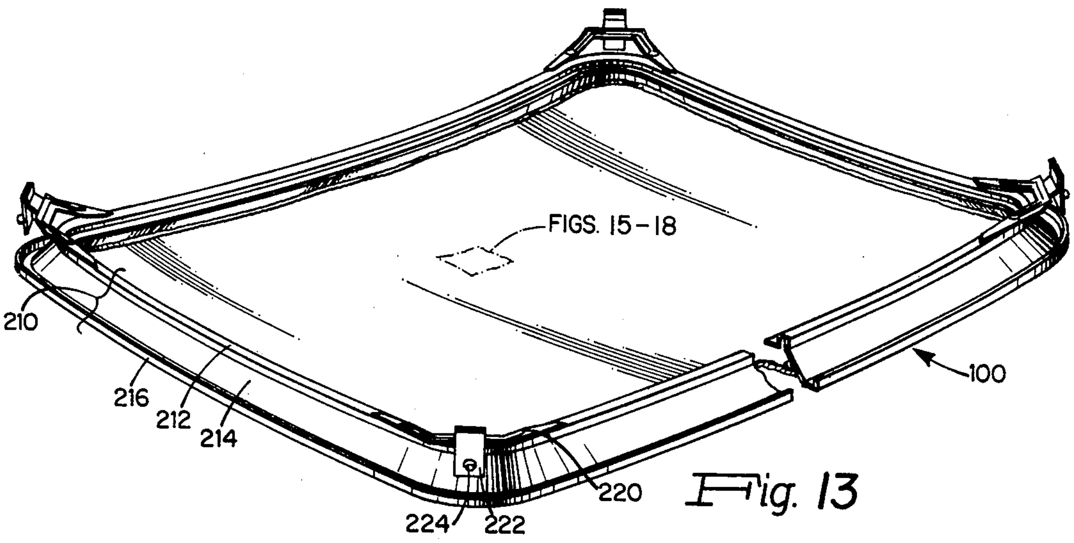
FIG. 13 is a perspective view of one of the four working screening masters used in the photochemical formation of phosphor screens.
Figure 14:
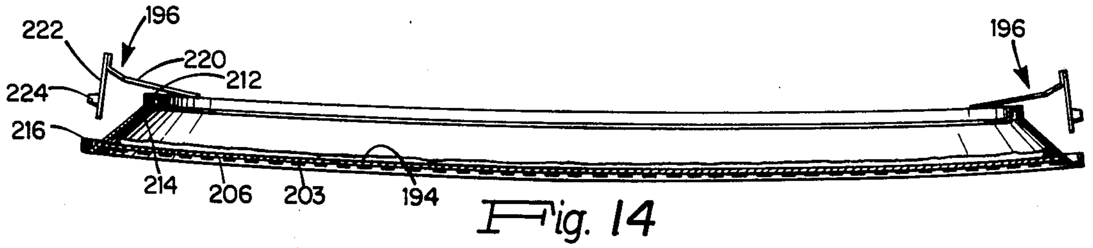
FIG. 14 is a sectioned, side elevational view of the FIG. 13 working screening master.
Figure 23:
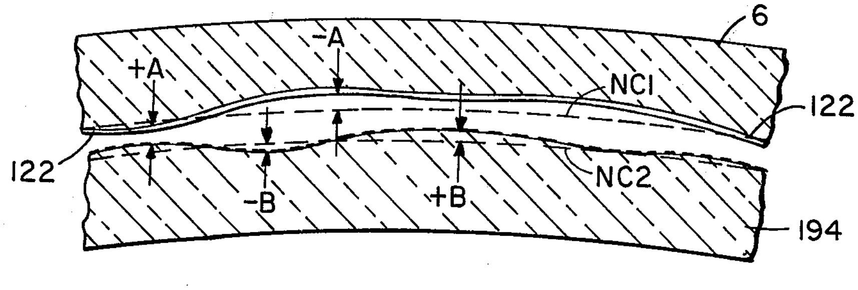
FIG. 23 is a greatly enlarged sectional view of a screening master blank and a faceplate, greatly magnified and distorted for purposes of illustration, illustrating the principle of near-contact printing employed in the making of phosphor screens.

It has been mentioned above a number of times that the screening lighthouse of the present invention may be used to screen faceplates of the character described using a shadow mask (as shown in FIGS. 1–3 at 12, e.g.) supported at the conventional mask-faceplate spacing (approximately ½inch) or, in a preferred alternative, a special screening master such as described above may be used. It has also been suggested a number of times that the special screening master preferably is supported in near-contact relationship with the faceplate during the faceplate exposure operation. The aforesaid near-contact exposure principle will now be described in more detail. Reference may be had to FIG. 23 which represents an enlarged and greatly exaggerated view of the faceplate 6 and the screening master blank 194 as supported in near contact relationship. The convex surface of the blank 194 and the addressed concave surface of the faceplate 6 should, for optimum utilization of the near contact exposure principle, have corresponding curvatures. In the screening lighthouse of this invention, the working master is attached to the studs 36 and hangs beneath the faceplate 6. By the construction of the screening master, the addressing surfaces of the blank 194 and the faceplate 6 are in very closely spaced but non-contacting relationship during the photoexposure of the photoresist coating 122 on the inside surface of the faceplate. By supporting the blank 194 and the faceplate 6 in non-touching relationship during exposure, the light image (of the stencil pattern formed on the convex surface of the blank 194) formed on the coating 122 is undegraded by any deformation of the blank 194 which might result if the blank 194 and faceplate 6 were permitted to touch during exposure. Any deformation of the blank 194 would result in a distortion of the transferred master pattern.

As an added benefit of the near-contact exposure of the stencil pattern on the blank 194 onto the faceplate 6, the exposure time required to expose the photoresist coating 122 is substantially reduced over what it would be if the exposure operation were carried out at a greater distance, as in the conventional faceplate photoscreening operation. Reduction in exposure time results from the fact that due to the very close spacing of the blank 194 from the faceplate 6, the penumbra-induced spreading of the transferred light image is minimized. A larger area light source (with proportionately greater luminous output) may thus be employed without increasing the degree of penumbra effect.

In FIG. 23, the concave surface of the blank 194 is shown to deviate (exaggerated) from a nominal curvature, shown by the broken line NC1, by a tolerance value ± A. The convex surface of the blank 194 is shown as deviating (also exaggerated) from a nominal curvature, as represented by the broken line NC2, by a tolerance value of ± B. In order to insure that the blank 194 and faceplate 6 are held in the aforedescribed close but non-contacting relationship, the spacing of the blank 194 from the faceplate 6 is caused to be slightly greater than A + B, that is, slightly greater than the sum of the maximum tolerance values assigned to the surface configurational deviations of the blank 194 and the faceplate 6. By way of example, if it is assumed that the blank 194 tolerance value A is ± 5 mils and faceplate 6 tolerance value B is ± 10 mils, the nominal spacing of the blank 194 from faceplate 6 should be between about 16 and 50 mils, preferably about 25 mils.

The invention is not limited to the particular details of construction of the embodiments depicted and other modifications and applications are contemplated. Certain changes may be made in the above-described apparatus without departing from the true spirit and scope of the invention herein involved.

I claim:

1. For use in photoscreening a phosphor pattern on the concave inner surface of a curved, approximately rectangular, flangeless color CRT faceplate having projections extending from a plurality of corner regions of said inner surface, a screening lighthouse comprising:

a base enclosing a light source; and a fixture on said base for supporting said faceplate in a predetermined position relative to said light source and with said inner surface thereof facing said light source, said fixture comprising:

a table, support means on said table for engaging said inner surface of said faceplate to support said faceplate, alignment chuck means positioned on said table in precise predetermined spatial relationship to said light source for receiving said faceplate projections in said corners of said faceplate to accurately position said faceplate relative to said light source, and prealignment post means spaced on the periphery of said table to roughly position said faceplate relative to said light source with said projections in rough registry with said chucks, said posts serving also as axial guide means for guiding the faceplate, once located against said prealignment posts, such that said projections are received by said chucks.

2. The lighthouse defined by claim 1 wherein said alignment chucks each comprise a pair of spaced spring jaws for receiving and centering said projections therebetween.

3. The lighthouse defined by claim 1 wherein the lower portion of each of said prealignment posts is relieved, i.e., it has a smaller diameter than a distal portion thereof, at a position on the post effective to shift positional control of the faceplate to the chucks as the studs enter the chucks.

4. The lighthouse defined by claim 3 wherein said alignment chucks each comprise a pair of spaced spring jaws for receiving and centering said studs therebetween, said spring jaws being embraced by stop means preventing outward overstressing of said springs.

5. For use in photoscreening a phosphor pattern on the concave inner surface of a curved, approximately rectangular, flangeless color CRT faceplate having shadow mask support studs extending from each of the four corner regions of said inner surface, a screening lighthouse comprising:

a base enclosing a light source; and a fixture on said base for supporting said faceplate in a predetermined position relative to said light source and with said inner surface thereof facing said light source, said fixture comprising:

a table, three support posts on said table for engaging said inner surface of said faceplate to support said faceplate, three alignment chucks positioned on three corners of said table in precise predetermined spatial relationship to said light source for receiving said studs on three corners of said faceplate to accurately position said faceplate relative to said light source, and three prealignment posts spaced around the periphery of said table, two along one side of the faceplate and the third along an adjoining side thereof, for making three-point engagement with the edge of said faceplate to roughly position said faceplate relative to said light source with said projections in rough registry with said chucks, said posts serving also as axial guide means for guiding the faceplate, once located against said prealignment posts, such that said projections are received by said chucks, a lower portion of each of said posts being relieved, i.e., it has a smaller diameter than a distal portion thereof, at a position on the post effective to shift positional control of the faceplate to the chucks as the studs enter the chucks.

* * * * *